Patented Feb. 14, 1939

2,147,097

UNITED STATES PATENT OFFICE 2,147,097

DEVELOPING PALATABILITY OF SOYA

Artemy A. Horvath, Newark, Del., assignor to Soya Corporation of America, a corporation of New York No Drawing. Application July 28, 1937, Serial No. 156,190

11 Claims. (Cl. 99—98)

This invention pertains to improvements in treating soya to improve its natural flavor or develop its palatability.

Soya beans are an oleaginous seed, which though not strictly a bean exhibit a "beany" flavor or odor.

An object of this invention is to remove this undesirable flavor and to perfect a more pleasing taste, whether the soya be in the form of the whole seed or be comminuted to meal or flour. A further object is to improve the palatability of the oil of the soya.

These and other objects are accomplished according to the principles of this invention by subjecting soya material to gas under such conditions as to absorb the gas, and then removing the gas together with undesirable flavoring or odoriferous substances in the soya.

The principles of this invention lend themselves to various embodiments, which will be illustrated by examples of what are now preferred forms of practice, and particularly set forth and defined in the accompanying claims. These practices of this invention utilize the phenomenon that soya at normal temperatures will absorb gases, and further that when such absorbed gases are expelled they carry with them substances constituting the "beany" taste or odor.

A particularly effective treatment is to subject the soya material to carbon dioxide under such conditions as to promote absorption of carbon dioxide gas. For example, carbon dioxide gas is applied at room temperature, such as about 40° C.; or preferably at temperatures that are lower, down to about freezing, or 0° C. Even lower temperatures may be utilized in this invention where not harmful to the product under treatment. Pressure of the gas may be atmospheric, but absorption may be promoted by such higher pressures as may be convenient. Subsequently the soya material which has absorbed the gas is subjected to conditions that favor expulsion of the gas. Preferably these conditions comprise higher temperatures than during absorption. However, reduced pressure during the stage of elimination also serves to promote removal of gas and unpalatable substances from the treated material. It is evident that these are relative conditions, but such conditions will now be apparent to those skilled in the art, on considering that unpalatable substances are volatilized when absorbed gas is expelled, or that such substances are volatilizable and that reduction of their necessary vapor pressure, or partial vapor pressure, is effected by absorption and then expulsion of gas.

Carbon dioxide at one atmosphere pressure is absorbed suitably, but mixtures of carbon dioxide with oxygen or with air also are useful, even at one atmosphere pressure, from room temperatures to freezing.

As further illustration of other forms of this invention, air alone may be utilized as the gas to be absorbed, but in this case higher pressures are desirable, of the order of up to sixty atmospheres, at about 40° to 0° C.

Absorption of gas in soya material is promoted by the presence of water or other solvents. For example, the entire "bean" or seed may be soaked whole in water before applying carbon dioxide or other gas, or in some instances carbon dioxide or other gas may be applied as a solution. Nevertheless, the soya "bean" or meal may be exposed dry to the gas to be absorbed.

Subsequently to the gas absorption, the soya material is heated, preferably rapidly, by hot air or by steam, or by contact with rolls or other hot surfaces, to promote volatilization of the gas and unpalatable substances.

It is a present view, though the practice of this invention is not limited to this theory, that the disagreeable substances in soya are ketonic in character, and in particular may be represented by methyl-n-nonyl ketone.

A further modified practice of this invention comprises removing the germ of the soya seed, and then applying the gas treatment herein described. This is based on the observation that certain of the unpalatable substances are combined in the germ portion of the soya and in the nearby parts of the cotyledons. It appears further that other combinations of these unpalatable or odoriferous substances are associated with the oil which is distributed throughout the soya seed and particularly throughout the cotyledons. The introduction of oxygen gas into the soya containing the germ portion assists particularly in releasing the odoriferous or unpalatable compounds therein. It is a particularly efficacious practice of this invention, therefore, to remove the germ portion of the whole soya, and then to cause carbon dioxide to be absorbed, and subsequently released, as herein described, to remove any residues of the undesirable compounds. These appear to have been retained with considerable tenacity by residual oil in the soya after degermination, and may appear even in cooked products such as bread from soya flour. Therefore even to soya meal or flour which has been treated for removal of oil, the present invention is applicable. In this connection, it is desirable to state that a particularly effective practice of this invention with whole or with comminuted soya is to absorb oxygen as described herein, and then remove the oxygen, and then to absorb carbon dioxide, and subsequently to expel the gas.

When the whole seed is to be treated for absorption of gas under this invention, it is effective to decorticate or dehull the seed prior to the gas absorption. This facilitates absorption and subsequent expulsion of the gas.

Soya meal may be treated with solutions of carbon dioxide in organic solvents such as benzene, methyl acetate and ether, or first with the solvent and then the gas.

The whole, dry soya bean may be exposed to substantially pure carbon dioxide at atmospheric pressure for about five minutes; and then heated for one to ten minutes at about 100° C. to expel the gas and unpalatable substances.

While this invention has been described by illustration of preferred examples in accordance with the patent statutes it will now be apparent to those skilled in this art that the principles of this invention may be embodied in other forms than those specifically set forth, within the scope of the appended claims.

What is claimed is:

1. A process of improving the flavor or odor of soya comprising treating the soya with gas under conditions to promote absorption of gas, both soya and gas being at temperatures of about 40° C., and then expelling the gas to remove volatile flavoring or odoriferous substances.

2. A process of improving the flavor or odor of soya comprising treating soya with carbon dioxide under conditions to promote absorption of carbon dioxide, both soya and carbon dioxide being at temperatures below about 40° C., and then expelling the gas to remove volatile flavoring or odoriferous substances.

3. A process of improving the flavor or odor of soya comprising treating soya with oxygen-bearing gas under conditions to promote absorption thereof at superatmospheric pressure up to about sixty atmospheres and temperatures of about 0° C. to 40° C., and then heating to expel the gas and volatile flavoring or odoriferous substances.

4. A process of improving the flavor or odor of soya comprising absorbing oxygen-bearing gas therein at superatmospheric pressures of about one to sixty atmospheres, and temperatures of about 0° to 40° C., and then expelling the gas and volatile flavoring or odoriferous substances, and then absorbing carbon dioxide in the soya material at temperatures below about 40° C., and then expelling the carbon dioxide and residual volatile flavoring or odoriferous substances.

5. A process of improving the flavor or odor of soya comprising degerminating the soya seed, then treating with carbon dioxide under conditions to promote absorption thereof, both soya and carbon dioxide being at temperatures below about 40° C., and expelling the carbon dioxide gas and residual volatile flavoring or odoriferous substances.

6. A process of improving the flavor or odor of soya comprising decorticating the soya seed and then absorbing gas therein at temperatures below about 40° C., and then expelling the gas to remove volatile flavoring or odoriferous substances.

7. A process of improving the flavor or odor of soya comprising decorticating and degerminating the soya seed and then treating with gas under conditions to promote absorption of gas, both soya and gas being at temperatures below about 40° C., and then expelling the gas to remove volatile flavoring or odoriferous substances.

8. A process comprising comminuting soya, treating with gas under conditions to promote absorption of gas, both soya and gas being at temperatures below about 40° C., and then expelling the gas to remove volatile flavoring or odoriferous substances.

9. A process comprising soaking soya beans in water then exposing to gas under conditions to promote absorption of gas in the beans at temperatures of about 0° to 40° C., and then expelling the gas together with volatile flavoring or odoriferous substances.

10. A process comprising exposing soya to substantially pure carbon dioxide at not substantially above atmospheric temperature and not substantially below atmospheric pressure, and then heating about one to ten minutes at about 100° C., to expel gas together with unpalatable substances.

11. A process of improving the flavor or palatability of soya, comprising treating soya meal with carbon dioxide in solution in organic solvents, and then expelling the carbon dioxide from the soya.

ARTEMY A. HORVATH.